United States Patent
Schwarz et al.

(10) Patent No.: US 7,158,810 B2
(45) Date of Patent: Jan. 2, 2007

(54) INDICATION OF USER EQUIPMENT CAPABILITIES BEFORE RADIO RESOURCE CONTROL CONNECTION

(75) Inventors: Uwe Schwarz, Veikkola (FI); Pekka Marjelund, Muijala (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/180,537

(22) Filed: Jun. 27, 2002

(65) Prior Publication Data

US 2004/0106430 A1 Jun. 3, 2004

(51) Int. Cl.
*H04Q 7/20* (2006.01)
(52) U.S. Cl. ............................... 455/552.1; 455/553.1
(58) Field of Classification Search ............. 455/552.1, 455/553.1, 453
See application file for complete search history.

(56) References Cited

U.S. PATENT DOCUMENTS

| | | | | |
|---|---|---|---|---|
| 5,420,911 A | * | 5/1995 | Dahlin et al. | 455/553.1 |
| 5,542,093 A | * | 7/1996 | Bodin et al. | 370/335 |
| 5,761,621 A | * | 6/1998 | Sainton | 455/552.1 X |
| 5,881,372 A | * | 3/1999 | Kruys | 455/552.1 X |
| 6,134,443 A | * | 10/2000 | Spann et al. | 455/552.1 X |
| 6,246,886 B1 | * | 6/2001 | Oliva | 455/553.1 X |
| 6,374,109 B1 | * | 4/2002 | Shaheen et al. | 455/552.1 X |
| 6,721,562 B1 | * | 4/2004 | Kelley | 455/552.1 X |

OTHER PUBLICATIONS

3GPP TS 25.331, V3.9.0 (Dec. 2001) Technical Specification, 3rd Generation Partnership Project; Technical Specification Group Radio Access Network; Radio Resource Control (RRC); Protocol Specification (Release 1999), Sec. 8.1.3 and 10.3.3.11, pp. 1-28, 63 & 364.

* cited by examiner

*Primary Examiner*—Matthew D. Anderson
*Assistant Examiner*—Philip J. Sobutka
(74) *Attorney, Agent, or Firm*—Robert M. Bauer, Esq.; Lackenbach Siegel, LLP

(57) ABSTRACT

The invention is a method of setup involving at least one user equipment and a system. A method of setup involving user equipment in accordance with the invention includes transmitting a request for communications from at least one user equipment (10), having a current band of operation in a wireless network (12), to a controller (14) of the wireless network, the request containing information indicating any capability of the at least one user equipment to operate in any other band other than the current band of operation in the wireless network; and the controller, in response to the capability of the at least one user equipment to operate in any other band than the current band of operation and load conditions in the network, transmits to the at least one user equipment that the communications are to be established in another band in the wireless network than the current band of operation in the wireless network.

101 Claims, 2 Drawing Sheets

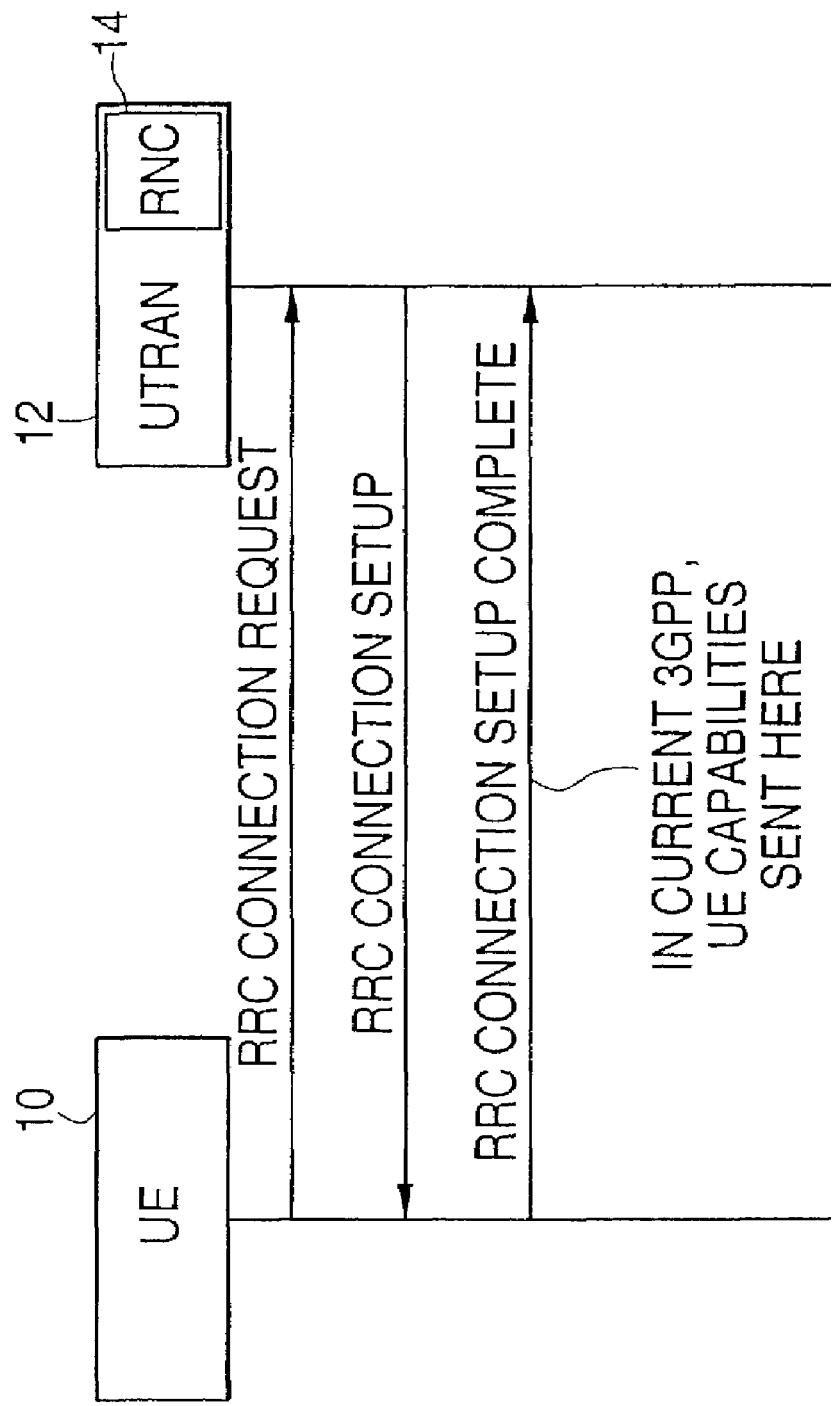

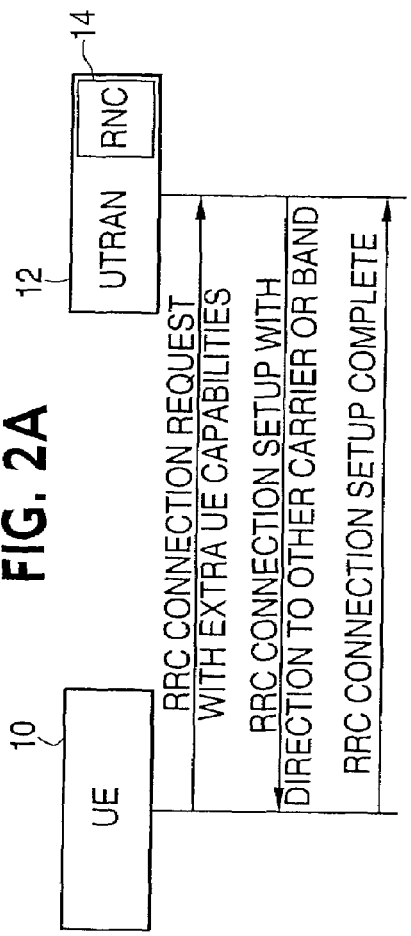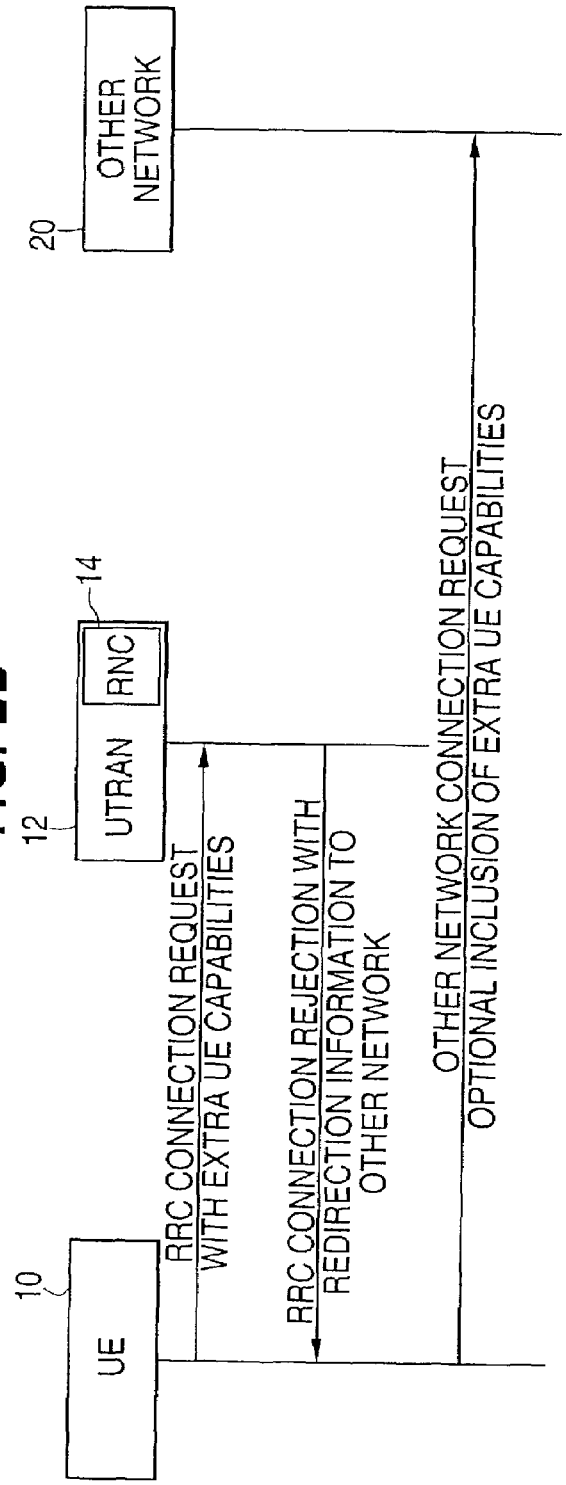

INDICATION OF USER EQUIPMENT CAPABILITIES BEFORE RADIO RESOURCE CONTROL CONNECTION

BACKGROUND OF THE INVENTION

The present invention relates to the connection of user equipment (UE) under the control of a network controller within a first wireless network to a new carrier or band in the first wireless network or to another wireless network.

DESCRIPTION OF THE PRIOR ART

FIG. 1 illustrates the connection of UE 10 to a universal terrestrial radio access network (UTRAN) 12 under the control of a radio network controller (RNC) 14 as specified in 3GPP 25.331, Section 8.1.3 which is incorporated herein by reference in its entirety. The RNC 14 sends a Radio Resource Control (RRC) CONNECTION SETUP message to the UE 10. Thereafter, the UE 10 sends an RRC CONNECTION SETUP COMPLETE message back to the RNC 14, which is in accordance with current 3GPP specifications and includes certain capabilities of the UE 10. The capabilities of the UE 10 contained in the RRC CONNECTION SETUP COMPLETE message are utilized by the RNC 14 in accordance with known operational procedures for a purpose other than permitting the RNC to move the UE 10 to a new carrier or band in UTRAN 12 or to another wireless network (not illustrated).

In a process known as "directed RRC connection setup", RNC 14 may direct UE 10, after the RRC CONNECTION REQUEST, to another carrier before setup is completed. This process has not been used to move UE 10 to a new band in UTRAN 12 or to a new network other than GSM/EDGE Radio Access Network (GERAN).

Additional frequency spectrum for use with wideband code division multiple access (WCDMA) is currently being discussed in the 3GPP RAN WG 4. Among new bands which are being discussed, is a band between 2.5 and 2.69 GHz. This new band is proposed to be used by UTRAN 12 for load balancing and has the advantage that the new band may be used because there is no need for the UTRAN to make interfrequency measurements in connection with the process known as "directed RRC connection setup". This permits savings of network capacity and allows full trunking gains.

However, UE 10 will become widely available which have the capacity to receive in the new frequency band. Until all UE 10 have this capability, only some of the UE may be shifted from the core band to the new band in the UTRAN 12. There is no current mechanism for informing the RRC 14 before setup is complete of the capability of the individual UE 10.

SUMMARY OF THE INVENTION

The present invention is a method of setup involving UE and a system. The present invention provides an improvement over the prior art by transmitting, in a request for setup such as, without limitation, in a RRC CONNECTION REQUEST between at least one UE and a controller of a first wireless network, information, such as a field, indicating any capability of the UE to operate with a new carrier or new band in the first wireless network or in another network. Additionally, other information may be transmitted in the field involving the operation of the UE alone or in combination with the aforementioned capability of the UE to operate with a new carrier or new band in a first wireless network or in another network. The other information may include a quality of service to be provided to the UE, content type of information to be provided to the UE, and/or information relating to the operation of the UE providing more detail than 3GPP traffic classes, such as minimum required bit rate, transfer delay, error rate or to direct a specified bit rate to a wireless local area network (WLAN) to be provided to the UE.

The information in the field has several usages. The capability of the UE to switch carriers and/or bands in the first network and to switch to other networks enables the RNC of the first wireless network to determine with respect to load conditions in the first network or other operational criteria of the first wireless network whether the UE is to be handed off to another carrier or band in the first network or to another network using a communication such as, but not limited to, directed RRC connection setup. Moreover, the providing of the other information enables the services which are provided to the UE once setup is complete to be efficiently delivered and enhanced in a new carrier or band in a first network or another network being made available to the UE.

A method of setup involving user equipment in accordance with the invention includes transmitting a request for communications from at least one user equipment, having a current band of operation in a wireless network, to a controller of the wireless network, the request containing information indicating any capability of the at least one user equipment to operate in any other band other than the current band of operation in the wireless network; and the controller, in response to the capability of the at least one user equipment to operate in any other band than the current band of operation and load conditions in the network, transmits to the at least one user equipment that the communications are to be established in another band in the wireless network than the current band of operation in the wireless network. The information may indicate only if the at least one user equipment will to operate in at least one other band than the current band of operation in the wireless network. The information may indicate any capability of the at least one user equipment to operate in any other band than the current band of operation of the wireless network and contains other information relating to operation of the at least one user equipment. The information may indicate that the at least one user equipment is operational in multiple bands which are identified in the field. The information may comprise one bit which indicates if the at least one user equipment is operational in only a single other band. The another band may include frequencies of at least 2.5 GHz. The information may include Information relating to a quality of service to be provided to the at least one user equipment, a content type of information to be provided to the at least one user equipment, a transfer delay to be provided to the at least one user equipment with the communications, or a bit rate to be provided with the communications to the at least one user equipment.

A system in accordance with the invention includes a wireless network; at least one user equipment having a current band of operation in the wireless network; and a controller of the wireless network; and wherein the at least one user equipment transmits to the controller a request for communications from the at least one user equipment in the wireless network, the request containing information indicating any capability of the at least one user equipment to operate within any other band than the current band of operation in the wireless network and the controller, in response to a capability of the at least one user equipment to operate in any other band than the current band of operation and load conditions in the wireless network, transmits to the at least one user equipment that communications are to be established in another band in the wireless network than the current band of operation in the wireless network. The information may indicate any capability of the at least one user equipment to operate in any other band than the current band of operation of the wireless network and contains other information relating to operation of the at least one user equipment. The information may indicate that the at least one user equipment is operational in multiple bands which are identified in the field. The information may comprise one bit which indicates if the at least one user equipment is operational in only a single other band. The another band may include frequencies of at least 2.5 GHz. The information may include Information relating to a quality of service to be provided to the at least one user equipment, a content type of information to be provided to the at least one user equipment, a transfer delay to be provided to the at least one user equipment with the communications, or a bit rate to be provided with the communications to the at least one user equipment.

A method of setup involving user equipment in accordance with the invention includes transmitting a request for communications from at least one user equipment, having a current carrier in a wireless network, to a controller of the wireless network, the request containing information indicating any capability of the at least one user equipment to operate with any other carrier other than the current carrier in the wireless network; and the controller, in response to the capability of the at least one user equipment to operate with any other carrier in the wireless network than with the current carrier and load conditions in the wireless network, transmits to the at least one user equipment that the communications are to be established with another carrier in the wireless network than the current carrier of the wireless network. The information may indicate that the at least one user equipment is operational in multiple carriers which are identified in the field. The information may comprise one bit which indicates if the at least one user equipment is operational in only a single other carrier. The another carrier may include communication frequencies in a 2.5–2.69 GHz. band, a 1900–1920 MHz. band or a 2010–2025 MHz. band. The information may include Information relating to a quality of service to be provided to the at least one user equipment, a content type of information to be provided to the at least one user equipment, a transfer delay to be provided to the at least one user equipment with the communications, or a bit rate to be provided with the communications to the at least one user equipment.

A system in accordance with the invention includes a wireless network; at least one user equipment having a current carrier in the wireless network; and a controller of the wireless network; and wherein the at least one user equipment transmits a request for communications from the at least one user equipment to the controller of the wireless network, the request containing information indicating any capability of the at least one user equipment to operate with any other carrier than the current carrier in the wireless network and the controller, in response to a capability of the at least one user equipment to operate with any other carrier than the current carrier and load conditions in the wireless network, transmits to the at least one user equipment that communications are to be established with another carrier in the wireless network than the current carrier in the wireless network. The information may indicate that the at least one user equipment is operational in multiple carriers which are identified in the field. The information may comprise one bit which indicates if the at least one user equipment is operational in only a single other carrier. The another band may include frequencies in a 2.5–2.69 GHz. band, a 1900–1920 MHz. band or a 2010–2025 MHz. band. The information may include Information relating to a quality of service to be provided to the at least one user equipment, a content type of information to be provided to the at least one user equipment, a transfer delay to be provided to the at least one user equipment with the communications, or a bit rate to be provided with the communications to the at least one user equipment.

A method of setup involving user equipment in accordance with the invention includes transmitting a request for communications from at least one user equipment currently operating in a first wireless network to a controller of the first wireless network, the request containing information indicating any capability of the at least one user equipment to operate within any other wireless network other than the first wireless network; and the controller, in response to a capability of the at least one user equipment to operate in another wireless network, transmits to the at least one user equipment that the communications are to be established in the another wireless network. The information may indicate that the at least one user equipment is operational in multiple wireless networks which are identified in the field. The information may comprise one bit which indicates if the at least one user equipment is operational in only a single other wireless network. The another network may include a WLAN. The information may include Information relating to a quality of service to be provided to the at least one user equipment, a content type of information to be provided to the at least one user equipment, a transfer delay to be provided to the at least one user equipment with the communications, or a bit rate to be provided with the communications to the at least one user equipment.

A system in accordance with the invention includes at least one user equipment; a first network including a network controller; at least one additional wireless network; and wherein the at least one user equipment transmits a request for communications from at least one user equipment, currently operating in the first wireless network, to the controller, the request containing information indicating any capability of the at least one user equipment to operate in any other wireless network than the first wireless network and the controller, in response to a capability of the at least one user equipment to operate in an other wireless network in the first wireless network, transmits to the at least one user equipment that communications are to be established in the another wireless network. The information may indicate that the at least one user equipment is operational in multiple other wireless networks which are identified in the information. The information may comprise one bit which indicates if the at least one user equipment is operational in only a single other wireless network. The another network may include a WLAN. The another network may include a wireless local area network. The information may include Information relating to a quality of service to be provided to the at least one user equipment, a content type of information to be provided to the at least one user equipment, a transfer delay to be provided to the at least one user equipment with the communications, or a bit rate to be provided with the communications to the at least one user equipment.

A method of setup involving user equipment in accordance with the invention includes transmitting a request for communications from at least one user equipment to a controller of a first wireless network, the request containing information pertaining to operation of the at least one user equipment in a wireless network; and the controller, in response to the information pertaining to the operation of the at least one user equipment and conditions in the first wireless network, transmits to the at least one user equipment that the communications are to be established in a wireless network in accordance with the information pertaining to the operation of the at least one user equipment. The field may indicate if the at least one user equipment will operate in at least one other band than a current band of operation in the first wireless network. The information may indicate if the at least one user equipment will operate with any other carrier than a current carrier of the at least one user equipment. The information may indicate if the at least one user equipment will operate in any other wireless network than the first wireless network. The information may include Information relating to a quality of service to be provided to the at least one user equipment, a content type of information to be provided to the at least one user equipment, a transfer delay to be provided to the at least one user equipment with the communications, or a bit rate to be provided with the communications to the at least one user equipment. The information may comprise one bit which indicates if the at least one user equipment is operational in only a single other band. The information may comprise one bit which indicates if the at least one user equipment is operational with only a single other carrier. The information may contain a single bit which indicates if the at least one user equipment is operational in only a single other wireless network. The another band may include frequencies of at least 2.5 GHz. The another carrier may include frequencies in a 2.5–2.69 GHz. band, a 1900–1920 MHz. band or 2010–2025 MHz. band. The another network may include a WLAN.

A system in accordance with the invention includes at least one user equipment; and a first wireless network including a controller; and wherein the at least one user equipment transmits a request for communications from the at least one user equipment to the controller, the request containing information pertaining to operation of the at least one user equipment in a wireless network and the controller, in response to the information pertaining to the operation of the at least one user equipment and conditions in the first wireless network, transmits to the at least one user equipment that communications are to be established in a wireless network in accordance with the information pertaining to the operation of the at least one user equipment. The information may include Information relating to a quality of service to be provided to the at least one user equipment, a content type of information to be provided to the at least one user equipment, a transfer delay to be provided to the at least one user equipment with the communications, or a bit rate to be provided with the communications to the at least one user equipment. The information may comprise one bit which indicates if the at least one user equipment is operational with only a single other carrier. The information may contain a single bit which indicates if the at least one user equipment is operational in only a single other wireless network. The another band may include frequencies in a 2.5–2.69 GHz. band, a 1900–1920 MHz. band or a 2010–2025 MHz. band.

BRIEF DESCRIPTION OF THE DRAWINGS

FIG. 1 illustrates a diagram of a prior art method of setup between UE and an UTRAN network.

FIGS. 2A and 2B illustrate block diagrams of a system and method of the present invention.

Like parts art identified with like designations throughout the drawings.

DESCRIPTION OF THE PREFERRED EMBODIMENTS

FIGS. 2A and 2B illustrate block diagrams of a system and method in accordance with the present invention. The system and method of FIGS. 2A and 2B differs from the prior art of FIG. 1 by transmitting information, such as in a field, specifying extra UE capabilities as part of a setup request for communications from UE 10 to RNC 14. The extra UE capabilities convey information about the capability of operation of the UE 10 in a band or with a carrier of a first network UTRAN 12 illustrated in FIG. 2A or in another network(s) 20 illustrated in FIG. 2B or other information about the operation of the UE, such as quality of service QoS, which the UE is to receive, information content which the UE is to receive, transfer delay which the UE is to receive or bit rate of the communications the UE is to receive. The extra capabilities of the embodiment of FIG. 2A include any new carrier capability and/or band capability in UTRAN 12 and the aforementioned other information. The extra capabilities of the embodiment of FIG. 2B, include any new network capability in other network 20 and the aforementioned other information. The extra UE capabilities which are transmitted by the UE setup message, such as in the RRC CONNECTION REQUEST, typically will include all the aforementioned information about operation in other bands or carriers of the first network UTRAN 12, about operation in other network 20 and the aforementioned other information so that the RNC 14 has the complete range of possible operations of the UE 10 during setup before determining the setup to be actually used. The another carrier(s) of FIG. 2A includes frequencies of at least 2.5 GHz., such as up to 2.69 GHz., or within a band 1900–1920 MHz. or a band 2010–2025 MHz. The another network(s) 20 include a WLAN and bit rates may be specified with the other information to the WLAN to provide high data rate communications. A preferred type high data setup request is the prior art RRC CONNECTION REQUEST which has been modified to include the aforementioned extra UE capabilities illustrated in FIGS. 2A and 2B. The information may be a single bit which indicates the operational capability of the UE 10 to operate in a single new band, or with a single new carrier in the first network UTRAN 12 as illustrated in FIG. 2A or within another network(s) 20 as illustrated in FIG. 2B. Alternatively, the information may contain multiple bits describing additional bands or carriers of operation in the first network UTRAN 12, as illustrated in FIG. 2A, or in new network(s) 20, as illustrated in FIG. 2B, and/or other information relating to UE including required minimum bit rate, transfer delay, UE requested quality of service or content type or any combination of the above included in the setup request such as the RRC CONNECTION REQUEST.

The RNC 14 determines from the RRC CONNECTION REQUEST and specifically, the aforementioned information, whether the UE 12 is capable of operation in other band or with another carrier in the first network UTRAN 12 as illustrated in FIG. 2A or in another network(s) 20 as illustrated in FIG. 2B, and/or is to operate in accordance with the other information which does not pertain to band or carrier operation in the first network UTRAN 12 or operation in another network(s) 20.

If the answer is "yes" that the UE 10 is capable of other carrier or band operation in the first network UTRAN 12, as illustrated in FIG. 2A or in another network(s) 20 as illustrated in FIG. 2B, the RNC 14 determines, in response to the indicated capability of the UE whether to operate in another band or carrier in the first network or in another network. This decision takes into consideration load or other conditions in the first network and/or other conditions such as service delay, quality of service, bit rate, or requested content to be provided to the UE 10. Assuming that load or other conditions warrant assigning the UE 10 to operate in another carrier or band of the UTRAN 12, as illustrated in FIG. 2A or in another network(s) 20 as illustrated in FIG. 2B, the RNC 14 transmits to the UE a message which may be a RRC CONNECTION SETUP message which indicates that the UE is to operate in another band or carrier of the first network UTRAN 12 than the current band or carrier of operation of the first wireless network as illustrated in FIG. 2A which includes a direction specifying the other carrier or band in UTRAN or a RRC CONNECTION REJECTION WITH REDIRECTION INFORMATION TO OTHER NETWORKS as illustrated in FIG. 2B. Thereafter the UE 10 transmits to the RNC 14 a message that setup is complete which may be the RRC CONNECTION SETUP COMPLETE message as illustrated in FIG. 2A or in case of redirection to another network 20 sends an OTHER NETWORK CONNECTION REQUEST message to the other network as illustrated in FIG. 2B. The OTHER NETWORK CONNECTION REQUEST message informs the other network 20 that the UE 10 is to have communications set up through it. The OTHER NETWORK CONNECTION REQUEST message may optionally include the EXTRA UE CAPABILITIES of the RRC CONNECTION REQUEST of FIG. 2A with the included information being used in the other network 20 in an analogous fashion to the use in FIG. 2A.

Conversely, if the RNC 14 determines that load or other conditions do not warrant that the UE 10 should operate in another band or carrier of the first network UTRAN 12 or in another network(s) 20, the RRC CONNECTION SETUP message indicates to the UE 10 that operation will continue in the UTRAN 12 in the current band or with the current carrier. Thereafter, a RRC CONNECTION SETUP COMPLETE message is transmitted from the UE 10 to the UTRAN 12.

The RNC 14 may, in response to the field in the setup request, use the directed RRC connection setup message, to assign the UE 10 to different carriers or different bands in the first network UTRAN 12 as illustrated in FIG. 2A or to another wireless network(s) 20 as illustrated in FIG. 2B. Load conditions or other conditions of the UTRAN 12 may be used as a basis to control assigning of the UE 10 to another band, such as the proposed 2.5 to 2.69 GHz. band, a 1900–1920 MHz. band or a 2010–2025 MHz. band or carrier in the first network UTRAN 12 than the current band or current carrier or to another network(s) 20 including WLANs. As a result of the set up request, such as the RRC CONNECTION REQUEST containing information indicating any other band or carrier capabilities of the UE 10 in the first network UTRAN 12 or network capability of the UE 10 in another network(s) 20, the RNC 14 may intelligently assign only those UEs which have the capability to operate in another band(s) or with another carrier(s) of the first network UTRAN or another network(s), so as to save network capacity and to permit efficient load sharing.

The other information within the setup request, e.g. in the RRC CONNECTION REQUEST, may be used alone or in combination with the band or carrier capability information of the UE 10 in the first network UTRAN 12 or new network(s) 20 discussed above. For example, as stated above, the other information may include information more detailed than 3GPP traffic classes, such as minimum required bit rate, transfer delays and error rates, requested service such as quality of service (QoS) parameters, or any subset thereof, if new band(s) are more suitable to the UE 10 for reasons such as uplink and downlink capacity or if particular types of content may be served in particular bands such as the result of legal restriction.

While the invention has been described in terms of its preferred embodiments, it should be understood that numerous modifications may be made thereto without departing from the spirit and scope of the present invention. It is intended that all such modifications fall within the scope of the appended claims.

The invention claimed is:

1. A method of call setup involving user equipment comprising:

transmitting a request for call setup from at least one user equipment, having a current band of operation in a wireless network, to a controller of the wireless network, the request containing information indicating any capability of the at least one user equipment to operate in any other band other than the current band of operation in the wireless network; and the controller, in response to the information in the request for call setup indicating the capability of the at least one user equipment to operate in any other band than the current band of operation and load conditions in the network, transmits to the at least one user equipment that the call is to be established in another band in the wireless network than the current band of operation in the wireless network.

2. A method in accordance with claim 1 wherein:

the information indicates only if the at least one user equipment will operate in at least one other band than the current band of operation in the wireless network.

3. A method in accordance with claim 1 wherein:

the information indicates any capability of the at least one user equipment to operate in any other band than the current band of operation of the wireless network and contains other information relating to operation of the at least one user equipment.

4. A method in accordance with claim 2 wherein:

the information indicates that the at least one user equipment is operational in multiple bands which are identified in the information.

5. A method in accordance with claim 3 wherein:

the information indicates that the at least one user equipment is operational in multiple bands which are identified in the information.

6. A method in accordance with claim 1 wherein:

the information comprises one bit which indicates if the at least one user equipment is operational in only a single other information.

7. A method in accordance with claim 1 wherein:

the another band includes frequencies of at least 2.5 GHz.

8. A method in accordance with claim 3 wherein the other information comprises:

information relating to a quality of service to be provided to the at least one user equipment.

9. A method in accordance with claim 3 wherein the other information comprises:

information relating to a content type of information to be provided to the at least one user equipment.

10. A method in accordance with claim 3 wherein the other information comprises:
information relating to a transfer delay to be provided to the at least one user equipment with the call.

11. A method in accordance with claim 3 wherein the other information comprises:
information relating to a bit rate to be provided with the call to the at least one user equipment.

12. A system comprising:
a wireless network;
at least one user equipment having a current band of operation in the wireless network; and
a controller of the wireless network; and wherein
the at least one user equipment transmits to the controller a request for a call setup from the at least one user equipment in the wireless network, the request containing information indicating any capability of the at least one user equipment to operate within any other band than the current band of operation in the wireless network and the controller, in response to the information in the request for call setup indicating the capability of the at least one user equipment to operate in any other band than the current band of operation and load conditions in the wireless network, transmits to the at least one user equipment that a call is to be established in another band in the wireless network than the current band of operation in the wireless network.

13. A system in accordance with claim 12 wherein:
the information indicates only if the at least one user equipment will operate in at least one other band than the current band of operation in the wireless network.

14. A system in accordance with claim 12 wherein:
the information indicates any capability of the at least one user equipment to operate in any other band than the current band of operation of the wireless network and contains other information relating to operation of the at least one user equipment.

15. A system in accordance with claim 13 wherein:
the information indicates that the at least one user equipment is operational in multiple bands which are identified in the information.

16. A system in accordance with claim 14 wherein:
the information indicates that the at least one user equipment is operational in multiple bands which are identified in the information.

17. A system in accordance with claim 12 wherein:
the information comprises one bit which indicates if the at least one user equipment is operational in only a single other band.

18. A system in accordance with claim 12 wherein:
the another band includes frequencies of at least 2.5 GHz.

19. A system in accordance with claim 14 wherein the other information comprises:
information relating to a quality of service to be provided to the at least one user equipment.

20. A system in accordance with claim 14 wherein the other information comprises:
information relating to a content type of information to be provided to the at least one user equipment.

21. A system in accordance with claim 14 wherein other information comprises:
information relating to a transfer delay to be provided to the at least one user equipment with the call.

22. A system in accordance with claim 14 wherein the other information comprises:
information relating to a bit rate to be provided with the call to the at least one user equipment.

23. A method of setup call involving user equipment comprising:
transmitting a request for call setup from at least one user equipment, having a current carrier in a wireless network, to a controller of the wireless network, the request containing information indicating any capability of the at least one user equipment to operate with any other carrier other than the current carrier in the wireless network; and
the controller, in response to the information in the request for call setup indicating the capability of the at least one user equipment to operate with any other carrier in the wireless network than with the current carrier and load conditions in the wireless network, transmits to the at least one user equipment that the call is to be established with another carrier in the wireless network than the current carrier of the wireless network.

24. A method in accordance with claim 23 wherein:
the information indicates only if the at least one user equipment will operate with any other carrier than the current carrier in the wireless network.

25. A method in accordance with claim 23 wherein:
the information indicates any capability of the at least one user equipment to operate with any other carrier than the current carrier of the wireless network and contains other information relating to operation of the at least one user equipment.

26. A method in accordance with claim 24 wherein:
the information indicates that the at least one user equipment is operational with multiple carriers which are identified in the information.

27. A method in accordance with claim 25 wherein:
the information indicates that the at least one user equipment is operational with multiple carriers which are identified in the information.

28. A method in accordance with claim 23 wherein:
the information comprises one bit which indicates if the at least one user equipment is operational with only a single other carrier in the network.

29. A method in accordance with claim 23 wherein:
the another band includes frequencies in a 2.5–2.69 GHz. band, a 1900–1920 MHz. band or a 2010–2025 MHz. band.

30. A method in accordance with claim 25 wherein the other information comprises:
information relating to a content type of information to be provided to the at least one user equipment.

31. A method in accordance with claim 25 wherein the other information comprises:
information relating to a transfer delay to be provided to the at least one user equipment with the call.

32. A method in accordance with claim 25 wherein the other information comprises:
information relating to a bit rate to be provided with the call to the at least one user equipment.

33. A system comprising:
a wireless network;
at least one user equipment having a current carrier in the wireless network; and
a controller of the wireless network; and wherein
the at least one user equipment transmits a request for call setup from the at least one user equipment to the controller of the wireless network, the request containing information indicating any capability of the at least one user equipment to operate with any other carrier than the current carrier in the wireless network and the controller, in response to the information in the request for call setup indicating a capability of the at least one user equipment to operate with any other carrier than the current carrier and load conditions in the wireless network, transmits to the at least one user equipment that the call is to be established with another carrier in the wireless network than the current carrier in the wireless network.

34. A system in accordance with claim 33 wherein:
the information indicates only if the at least one user equipment will operate with any other carrier than the current carrier in the wireless network.

35. A system in accordance with claim 33 wherein:
the information indicates any capability of the at least one user equipment to operate with any other carrier than the current carrier of the wireless network and contains other information relating to operation of the at least one user equipment.

36. A system in accordance with claim 34 wherein:
the information indicates that the at least one user equipment is operational with multiple carriers which are identified in the information.

37. A system in accordance with claim 35 wherein:
the information indicates that the at least one user equipment is operational with multiple carriers which are identified in the information.

38. A system in accordance with claim 33 wherein:
the information comprises one bit which indicates if the at least one user equipment is operational with only a single other carrier in the network.

39. A system in accordance with claim 33 wherein:
the another band includes frequencies in a 2.5–2.69 GHz. band, a 1900–1920 MHz. band or a 2010–2025 MHz. band.

40. A method in accordance with claim 35 wherein the other information comprises:
information relating to a quality of service to be provided to the at least one user equipment.

41. A system in accordance with claim 35 wherein the other information comprises:
information relating to a content type of information to be provided to the at least one user equipment.

42. A system in accordance with claim 35 wherein the other information comprises:
information relating to a transfer delay to be provided to the at least one user equipment with the call.

43. A system in accordance with claim 35 wherein the other information comprises:
information relating to a bit rate to be provided with the call to the at least one user equipment.

44. A method of setup call involving user equipment comprising:
transmitting a request for call setup from at least one user equipment currently operating in a first wireless network to a controller of the first wireless network, the request containing information indicating any capability of the at least one user equipment to operate within any other wireless network other than the first wireless network; and
the controller, in response to the information in the request for call setup indicating a capability of the at least one user equipment to operate in another wireless network, transmits to the at least one user equipment that the call is to be established in the another wireless network.

45. A method in accordance with claim 44 wherein:
the information indicates only if the at least one user equipment will operate within at least one other wireless network than the first wireless network.

46. A method in accordance with claim 44 wherein:
the information indicates any capability of the at least one user equipment to operate in any other wireless network than the first wireless network and contains other information relating to operation of the at least one user equipment.

47. A method in accordance with claim 45 wherein:
the information indicates that the at least one user equipment is operational in multiple other wireless networks which are identified in the information.

48. A method in accordance with claim 46 wherein:
the information indicates that the at least one user equipment is operational in multiple other wireless networks which are identified in the information.

49. A method in accordance with claim 45 wherein:
the information comprises one bit which indicates if the at least one user equipment is operational in only a single other wireless network.

50. A method in accordance with claim 45 wherein:
the other network includes a WLAN.

51. A method in accordance with claim 46 wherein the other information comprises:
information relating to a quality of service to be provided to the at least one user equipment.

52. A method in accordance with claim 46 wherein the other information comprises:
information relating to a content type of information to be provided to the at least one user equipment.

53. A method in accordance with claim 46 wherein the other information comprises:
information relating to transfer delay to be provided to the at least one user equipment with the call.

54. A method in accordance with claim 46 wherein the other information comprises:
information relating to a bit rate to be provided with the call to the at least one user equipment.

55. A system comprising:
at least one user equipment;
a first network including a network controller;
at least one additional wireless network; and wherein
the at least one user equipment transmits a request for call setup from at least one user equipment, currently operating in the first wireless network, to the controller, the request containing information indicating any capability of the at least one user equipment to operate in any other wireless network than the first wireless network and the controller, in response to the information in the request for call setup indicating a capability of the at least one user equipment to operate in an other wireless network, transmits to the at least one user equipment that the call is to be established in the another wireless network.

56. A system in accordance with claim 55 wherein:
the information indicates only if the at least one user equipment will operate within at least one other wireless network than the first wireless network.

57. A system in accordance with claim 56 wherein:
the information indicates that the at least one user equipment is operational multiple other wireless networks which are identified in the information.

58. A system in accordance with claim 56 wherein:
the information comprises one bit which indicates if the at least one user equipment is operational in only a single other wireless network.

59. A system in accordance with claim 55 wherein:
the information indicates any capability of the at least one user equipment to operate in any other wireless network than the first wireless network and contains other information relating to operation of the at least one user equipment.

60. A system in accordance with claim 59 wherein:
the information indicates that the at least one user equipment is operational multiple other wireless networks which are identified in the information.

61. A system in accordance with claim 59 wherein the other information comprises:
information relating to a quality of service to be provided to the at least one user equipment.

62. A system in accordance with claim 59 wherein the other information comprises:
information relating to a content type of information to be provided to the at least one user equipment.

63. A system in accordance with claim 59 wherein the information comprises:
information relating to a transfer delay to be provided to the at least one user equipment with the call.

64. A method in accordance with claim 63 wherein the information comprises:
information relating to a transfer delay to be provided to the at least one user equipment with the call.

65. A system in accordance with claim 59 wherein the other information comprises:
information relating to a bit rate to be provided with the call to the at least one user equipment.

66. A method in accordance with claim 65 wherein the information comprises:
information relating to a transfer delay to be provided to the at least one user equipment with the call.

67. A method in accordance with claim 55 wherein:
the other network includes a WLAN.

68. A method of setup call involving user equipment comprising:
transmitting a request for call setup from at least one user equipment to a controller of a first wireless network, the request containing information pertaining to operation of the at least one user equipment in a wireless network; and
the controller, in response to the information in the request for call setup pertaining to the operation of the at least one user equipment and conditions in the first wireless network, transmits to the at least one user equipment that the call is to be established in a wireless network in accordance with the field pertaining to the operation of the at least one user equipment.

69. A method in accordance with claim 68 wherein the information comprises:
information relating to a quality of service to be provided to the at least one user equipment.

70. A method in accordance with claim 68 wherein the information comprises:
information relating to a content type of information to be provided to the at least one user equipment.

71. A method in accordance with claim 68 wherein the information comprises:
information relating to a bit rate to be provided with the call to the at least one user equipment.

72. A method in accordance with claim 68 wherein:
the information comprises one bit which indicates if the at least one user equipment is operational in only a single other band of operation.

73. A method in accordance with claim 68 wherein:
the information comprises one bit which indicates if the at least one user equipment is operational with only a single other carrier.

74. A method in accordance with claim 68 wherein:
the information comprises one bit which indicates if the at least one user equipment is operational with only a single other carrier.

75. A method in accordance with claim 68 wherein:
the information indicates if the at least one user equipment will operate in at least one other band than a current band of operation in the first wireless network.

76. A method in accordance with claim 75 wherein the information comprises:
information relating to a quality of service to be provided to the at least one user equipment.

77. A method in accordance with claim 75 wherein the information comprises:
information relating to a content type of information to be provided to the at least one user equipment.

78. A method in accordance with claim 75 wherein the information comprises:
information relating to a bit rate to be provided with the call to the at least one user equipment.

79. A method in accordance with claim 75 wherein the information comprises:
information relating to a transfer delay to be provided to the at least one user equipment with the call.

80. A method in accordance with claim 75 wherein:
the another band includes frequencies of at least 2.5 GHz.

81. A method in accordance with claim 68 wherein:
the information indicates if the at least one user equipment will operate with any other carrier than a current carrier of the at least one user equipment.

82. A method in accordance with claim 81 wherein the information comprises:
the information relating to quality of service to be provided to the at least one user equipment.

83. A method in accordance with claim 81 wherein the information comprises:
information relating to a content type of information to be provided to the at least one user equipment.

84. A method in accordance with claim 81 wherein the information comprises:
information relating to a transfer delay to be provided to the at least one user equipment with the call.

85. A method in accordance with claim 81 wherein the information comprises:
information relating to an identification of a bit rate to be provided with the call to the at least one user equipment.

86. A method in accordance with claim 81 wherein:
the another carrier includes frequencies of a 2.5–2.69 GHz. band, a 1900–1920 MHz. band or a 2010–1025 MHz. band.

87. A method in accordance with claim 68 wherein:
the information indicates if the at least one user equipment will operate in any other wireless network than the first wireless network.

88. A method in accordance with claim 87 wherein the information comprises:
information relating to quality of service to be provided to the at least one user equipment.

89. A method in accordance with claim 87 wherein the information comprises:
information relating to a content type of information to be provided to the at least one user equipment.

90. A method in accordance with claim 87 wherein the information comprises:
information relating to a bit rate to be provided with the call to the at least one user equipment.

91. A method in accordance with claim 87 wherein:
the other network includes a WLAN.

92. A system comprising:
at least one user equipment; and
a first wireless network including a controller; and
wherein
the at least one user equipment transmits a request for call setup from the at least one user equipment to the controller, the request containing information pertaining to operation of the at least one user equipment in a wireless network and the controller, in response to the information in the request for call setup pertaining to the operation of the at least one user equipment and conditions in the first wireless network, transmits to the at least one user equipment that communications are to be established in a wireless network in accordance with the field pertaining to the operation of the at least one user equipment.

93. A system in accordance with claim 92 wherein:
the information indicates if the at least one user equipment will operate in at least one other band than a current band of operation in the first wireless network.

94. A system in accordance with claim 92 wherein the information comprises:
information relating to a quality of service to be provided to the at least one user equipment.

95. A system in accordance with claim 92 wherein the information comprises:
information relating to a content type of information to be provided to the at least one user equipment.

96. A system in accordance with claim 92 wherein the information comprises:
information relating to a transfer delay to be provided to the at least one user equipment with the call.

97. A system in accordance with claim 92 wherein:
information relating to a bit rate to be provided with the call to the at least one user equipment.

98. A system in accordance with claim 92 wherein:
the information indicates if the at least one user equipment will operate with any other carrier than a current carrier of the at least one user equipment.

99. A system in accordance with claim 98 wherein:
the another carrier includes frequencies of a 2.5–2.69 GHz. band, a 1900–1920 MHz. band or a 2010–2025 MHz. band.

100. A system in accordance with claim 92 wherein the information comprises:
the information indicates if the at least one user equipment will operate in any other wireless network than the first wireless network.

101. A system in accordance with claim 100 wherein:
the other network includes a WLAN.

* * * * *